(12) United States Patent
Herzog

(10) Patent No.: US 6,188,672 B1
(45) Date of Patent: Feb. 13, 2001

(54) CIRCUIT ARRANGEMENT FOR SENSING ERRORS IN BIT PATTERNS

(75) Inventor: Werner Herzog, Berlin (DE)

(73) Assignee: Deutsche Telekom AG, Bonn (DE)

( * ) Notice: Under 35 U.S.C. 154(b), the term of this patent shall be extended for 0 days.

(21) Appl. No.: 09/061,703

(22) Filed: Apr. 16, 1998

(30) Foreign Application Priority Data

Apr. 16, 1997 (DE) .............................. 197 15 829

(51) Int. Cl.[7] .................................................. H04L 1/00
(52) U.S. Cl. .................. 370/242; 370/252; 714/706; 714/819
(58) Field of Search ................... 714/704, 706, 714/715, 819, 735, 824; 370/242, 241, 252, 248

(56) References Cited

U.S. PATENT DOCUMENTS

| | | | |
|---|---|---|---|
| 4,363,123 | * 12/1982 | Grover | 371/5 |
| 5,696,767 | * 12/1997 | Hattori | 371/5.1 |
| 5,703,409 | * 12/1997 | Fukumitsu | 371/5.1 |
| 5,761,216 | * 6/1998 | Sotome | 371/27.1 |
| 5,884,101 | * 3/1999 | Archie | 395/877 |

OTHER PUBLICATIONS

Annual Report 1981 of the Research Institute of the DBP at FTZ, p. 29.

* cited by examiner

Primary Examiner—Hassan Kizou
Assistant Examiner—Roberta Stevens
(74) Attorney, Agent, or Firm—Kenyon & Kenyon

(57) ABSTRACT

A circuit arrangement for sensing errors in bit patterns for recording and plotting the occurrence in time, precisely to a bit, of transmission errors in a binary test signal. A pulse-generating device (5), which is fed a bit error signal sequence (BFS) generates a pulse (IS) in response to every signal change. A counting device (11), increments a counter as a function of a supplied bit timing (BT) and resets it to count value 1 when the pulse (IS) from the pulse-generating device (5) is applied. A buffer device (13) linked to the outputs of the counting device stores the counter contents of the counting device (11) in response to the application of a pulse (IS). An evaluation device (17,19,23) is fed, stores and displays the buffered counter contents.

15 Claims, 2 Drawing Sheets

CIRCUIT ARRANGEMENT FOR SENSING ERRORS IN BIT PATTERNS

FIELD OF THE INVENTION

The present invention relates to a circuit arrangement for sensing errors in bit patterns for recording the occurrence in time, precisely to a bit, of transmission errors in a binary test signal, in particular for plotting a bit-error signal sequence produced by a comparator circuit on the basis of a test signal and a substantially identical reference signal.

RELATED TECHNOLOGY

It is generally known that bit-error measuring units transmit quasi-randomly distributed binary signal sequences, or pseudo random binary sequences (PRBS), as measuring signals over a measuring transmission path. These sequences are then synchronized on the receiving side to an identically generated PRBS and compared on a bit-by-bit basis. This comparison yields a further binary signal sequence, in which one signal state signifies conformity, and the other, deviation. This binary signal sequence, referred to as a bit-error pattern, represents an exact image of the disturbance response of the transmission path.

This binary signal comparison process has been generally limited to adding the binary data at the comparator output and deriving the so-called bit-error rate or bit-error number therefrom. Although information about the bit-error pattern is retained, important information about the position of the bit errors within the binary signal sequence is lost. When the bit error pattern is detected, each bit error and the instant of its occurrence are registered. However, due to the tremendous amount of data, it is impossible to record the entire binary signal sequence from the comparator. It has therefore been a goal to diminish redundancy in a detected bit error pattern sufficiently to permit continuous data registration without loss of data.

The known recording method, designed for transmission rates of up to 140 mbit/s, is limited to plotting those sections of the binary signal sequence which represent the bit error pattern, namely only those containing the bit errors. See Annual Report 1981 of the Research Institute of the DBP at FTZ, p. 29. To determine the bit errors under this method, sections of signal which are 32 bits in length are formed. Rather than checking each bit of the binary signal sequence individually, the 32 bit-length sections are analyzed for the presence of bit errors. This prolongs by a factor of 32 the time available for testing and response. The method permits a high processing rate to be achieved using components of moderate speed.

According to the known method, a section is stored when it contains one or more bit errors. When a section is error-free, it is ignored. To determine the position of the stored sections in the data stream, the current reading of a clock-pulse counter is stored along with every section. The clock-pulse counter continuously counts the data cycle, beginning with the start of measurement.

In addition to bit-error pattern sections, failure signals which indicate failure of the measuring path through AIS/duration-0 (alarm indication signal) and synchronism losses (slip) are recorded. After being buffered to compensate for different data velocities, all of these data are stored in a binary block-oriented format on a storage medium. The resulting bit-error pattern may be represented off-line in the form of a numerical sequence, but only after the measurement is concluded, and with computer support.

Off-line representation of the bit-error pattern makes use of two variables, "error length" and "error interval". Error length signifies the number of bits, in direct succession, that have been incorrectly transmitted, while error interval represents the number of bits, in direct succession, transmitted without errors. These definitions may be used to describe the bit error pattern as a sequence of numerical values representing the error lengths (F) and error intervals (G). This error length/error interval sequence is denoted hereinafter simply as the "F/G sequence." The F/G sequence represents a meaningful measuring result that can be immediately utilized. Moreover, it forms the basis for a number of further analyses, which are directed to special evaluation goals.

One drawback of the known method is that considerable hardware outlay is required to recode the bit-error signal sequence into a complicated intermediate format. The detecting unit is as a result quite complex. The binary data in this recorded format cannot easily be read. They are represented in an unprocessed form as a dot matrix during an on-going measurement. Therefore, the data are only conditionally suited for monitoring the measurement, since interpreting them presupposes a detailed knowledge of the block format. Measurements of longer duration require the manual assistance of specialists, and thus a greater outlay for training and instruction.

To ensure that the measuring operation is not flawed because of measurement set-up errors, the usefulness of the first measuring results is checked before the continuous recording process is started. For this purpose, a so-called "quick look" unit is used off-line to check the results of a brief sample measurement.

Another disadvantage associated with the known method of partitioning the bit-error signal sequence into 32-bit segments is that failure signals are detected with limited accuracy rather than single-bit precision. Additionally, the measurement results are stored initially on an intermediate storage medium, rather than directly on disk. Non-volatile solid state memories are used as intermediate storage media. Only after the measurement operation is concluded is it possible to read the measuring data from the intermediate storage media, to transfer the data out of the block format into the F/G sequence, and to store the data on disk. An additional read device with software is required for the recoding operation.

SUMMARY OF THE INVENTION

An object of the present invention is to reduce the outlay required in terms of hardware for detecting bit error patterns, and to make immediately readable results available during the on-going measuring operation.

Another object on the present invention is to diminish redundancy in a detected bit error pattern sufficiently to permit continuous data registration without loss of data.

The present invention therefore provides a circuit arrangement for sensing errors in bit patterns for plotting the occurrence in time, precisely to a bit, of transmission errors in a binary test signal, in particular for plotting a bit-error signal sequence (BFS) produced by a comparator circuit (3) on the basis of a test signal and a substantially identical reference signal. The present invention is characterized by a pulse-generating device (5), which is fed the bit-error signal sequence (BFS) and which generates a pulse (IS) in response to every signal change; a counting device (11), which increments a counter as a function of a supplied bit timing (BT) and resets it to the count value 1 when the pulse (IS) from the pulse-generating device (5) is applied; a buffer device (13) linked to the outputs of the counting device (11), said buffer device (13) buffering the counter content of the counting device (11) in response to the application of a pulse (IS); and an evaluation device (17,19,23), which is fed the buffered counter contents.

The F/G sequence is produced directly from the bit-error signal sequence of the comparator device in that a counting device alternately counts directly successive bits of the same signal state. A pulse having a duration of one clock-pulse period is generated with every signal change at the comparator output by a pulse-generating device, said pulse terminating the bit counting in the counting device for the current element of the F/G sequence. In addition, the pulse causes the counter content to be loaded into a buffer device and the counter to then be erased. The pulse also causes the first bit of the next element to be counted in that a "1" is loaded into the counting device.

The measuring data are passed through the buffer device primarily to compensate for different data velocities. The measuring data are next processed in an evaluation device. The evaluation device preferably comprises a PC (personal computer), to which the measuring data are preferably transferred in an instantaneously readable form. The PC continuously displays and stores the measuring data. Measuring data comprising the lengths of constant signal states, versus the signal states themselves, are recorded and displayed. In this way, redundancy in the detected bit error pattern is reduced.

In the event of a more concentrated, lasting bit error rate, it is advantageous to switch temporarily from recording bit error patterns to measuring bit error rates. This prevents the buffer device from overflowing. In this way continued recordation is ensured.

Advantages of this circuit arrangement for sensing bit error patterns include the simplicity of the circuit arrangement. Comparatively little hardware is needed to directly generate the F/G sequence. The bit error pattern is detected completely, rather than in sections. There is no need for the clock-pulse counter used in known methods for addressing the recorded sections. Moreover, failure signals are detected with single-bit precision since the known 32-bit subdivision method is not employed.

In one embodiment, the modest size of the circuit arrangement makes it possible to integrate the bit error pattern detection hardware into the receiving section of a given data measuring device. In that embodiment, the bit error pattern detection hardware occupies only two card positions in the European format. This signifies a substantial simplification for measuring applications.

The circuit arrangement for sensing bit error patterns of the present invention permits a PC equipped with MS-DOS to be used for displaying and storing the measuring data. The PC may be connected via appropriate interfaces at the measuring location. The necessary software can be easily installed and later erased. In this way, the PC does not represent an increased hardware outlay. Moreover, the measuring results can be displayed on-line, in a straightforward, readable form. No special technical knowledge or tedious training is required to perform the monitoring of the on-going measuring operation. Unlike known methods, the present invention requires no supplemental, quick-look device to initially evaluate the measuring results off-line at the measuring location. Also, the measuring results can be stored on a conventional storage medium, such as a 3.5" PC disk. This simplifies further processing of the measuring results.

Other advantageous embodiments of the present invention include:

(1) that the pulse-generating device (5) has two series-connected flip-flops (7.1,7.2), and an exclusive-or gate, the outputs of the flip-flops (7.1, 7.2) being connected to two inputs of the exclusive-or gate (9) for generating a pulse (IS), and in that the bit timing (BT) is supplied as a clock-pulse signal to the two flip-flops (7.1,7.2);

(2) that the pulse-generating device (5) has an additional output, where the output signal from the first flip-flop (7.1) is adapted to be tapped off;

(3) that the counting device (11) has set inputs (A through N), to which the binary count value 1 is applied, which is able to be accepted as a current counter status using a control signal (LD);

(4) that the buffer device (13) has a control input (W), to which a control signal is applied for buffering the counter content;

(5) that the buffer device (13) is able to be fed the output signal ($Q_1$) from the first flip-flop (7.1) and/or information signals, preferably AIS and SLIP signals, for intermediate storage;

(6) that the outputs of the buffer device are linked to a parallel-to-serial converter (17), to convert the parallel output signal for further processing;

(7) that the evaluation device comprises a microcontroller (19);

(8) that the microcontroller (19) comprises a device which supplies the current time/date, and whose output signal is able to be fed as an information signal to the buffer device (13);

(9) that the evaluation device comprises an interface (21) for connecting a computer (23); and

(10) in response to a buffer overflow that is to be anticipated, the evaluation device switches over to a bit error rate measurement.

BRIEF DESCRIPTION OF THE DRAWINGS

The present invention will now be elucidated on the basis of a exemplary embodiment, with reference to the drawings in which.

DETAILED DESCRIPTION

Figure 1:
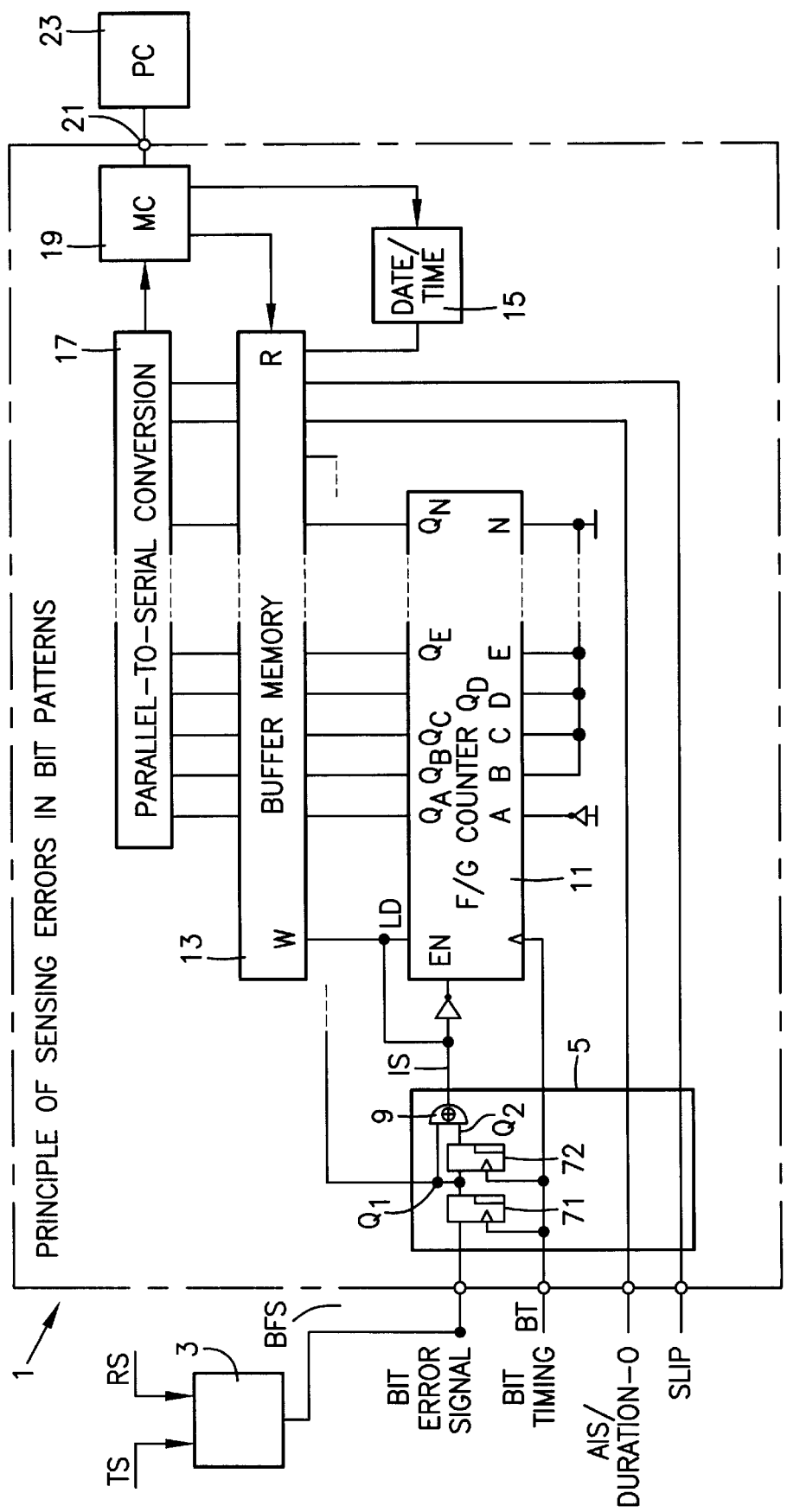
FIG. 1 shows a block diagram of a circuit arrangement for sensing errors in bit patterns.

FIG. 1 illustrates an embodiment of the present invention, a circuit arrangement 1 for sensing errors in bit patterns. Circuit arrangement 1 is configured to detect the bit error pattern of a binary test signal. The circuit receives the bit error signal from a comparator circuit 3, which is fed a test signal TS and a reference signal RS. The test signal is a quasi randomly distributed binary signal sequence, which has run through the measuring path. The reference signal is an identically produced binary signal sequence, which is synchronized to the test signal. The comparator compares the two binary signal sequences on a bit-by-bit basis and generates a further binary signal sequence BFS, which is applied to the output of the comparator. The two input signals TS, RS are compared so that in response to conformity of the signals, the output signal assumes a first signal state, and in response to non-conformity, the output signal assumes a second signal state. An EXCLUSIVE-OR circuit is suitable for use as a logic element.

Circuit arrangement 1 for sensing errors in bit patterns preferably comprises a pulse-generating circuit 5, which is fed both bit error sequence BFS and bit timing BT. Pulse-generating circuit 5 itself has two flip-flops 7.1 and 7.2, as well as an exclusive-or gate 9. The two flip-flops 7.1, 7.2 are connected in series so that the output of first flip-flop 7.1 is linked to the input of second flip-flop 7.2. The two flip-flops 7.1, 7.2 are supplied with the bit timing BT. Two inputs of exclusive-or gate 9 are connected to the outputs of the two flip-flops 7.1, 7.2. The output signal from exclusive-or gate 9 representing output signal IS from pulse-generating circuit 5.

With further reference to FIG. 1, as embodied herein counter 11 is connected downstream from pulse-generating circuit 5. Counter 11 is provided with a number N of counter outputs $Q_{A..N}$ and a corresponding number N of set inputs A through N. Set inputs A through N can be used to set a predefined counter value. Besides a clock input supplied with bit timing BT, counter 11 has an enable signal input EN and a load signal input LD. As embodied herein, a signal applied to input EN causes the counting of the clock signals of bit timing BT to be interrupted, while a signal at load signal input LD permits the signals being applied to the set inputs A through N to be transferred to outputs Q. In the present exemplary embodiment, set inputs B through N receive ground (low signal) and set input A receives 5 volts (high signal). This enables counter 11 to be reset to value "1" in response to the application of a load signal.

As embodied herein, buffer memory 13 is connected downstream from counter 11. The memory inputs of buffer memory 13 are linked to counter outputs $Q_A$ to $Q_N$. Output signal $Q_1$, from first flip-flop 7.1 of pulse-generating circuit 5 is fed to buffer memory 13 as a further input signal. Also fed to buffer memory 13 as input signals are additional information signals, which preferably include AIS (alarm indication signal, failure of the measuring path) and SLIP (loss of character synchronization) signals. Additionally, clock 15 feeds the current date and time to buffer memory 13.

As embodied herein, buffer memory 13 is provided with write input W and a read input R as control inputs. In the present exemplary embodiment, write input W is linked to load signal input LD of counter 11.

As embodied herein, the outputs of buffer memory 13 are linked to downstream parallel-to-serial converter 17, which converts to serial signals those signals which are present as parallel signals, i.e., it converts the binary numerical value into a serial signal sequence.

As embodied herein, a microcontroller 19 is connected downstream from converter 17. Microcontroller 19 receives the serial data stream and processes it so that the measured data are transmitted by a conventional serial PC (personal computer) interface 21 to a standard PC 23. Using appropriate software, the measured data may preferably be displayed and stored at PC 23. Microcontroller 19 also provides for driving clock 15 and for activating read input R of buffer memory 13.

Figure 2:
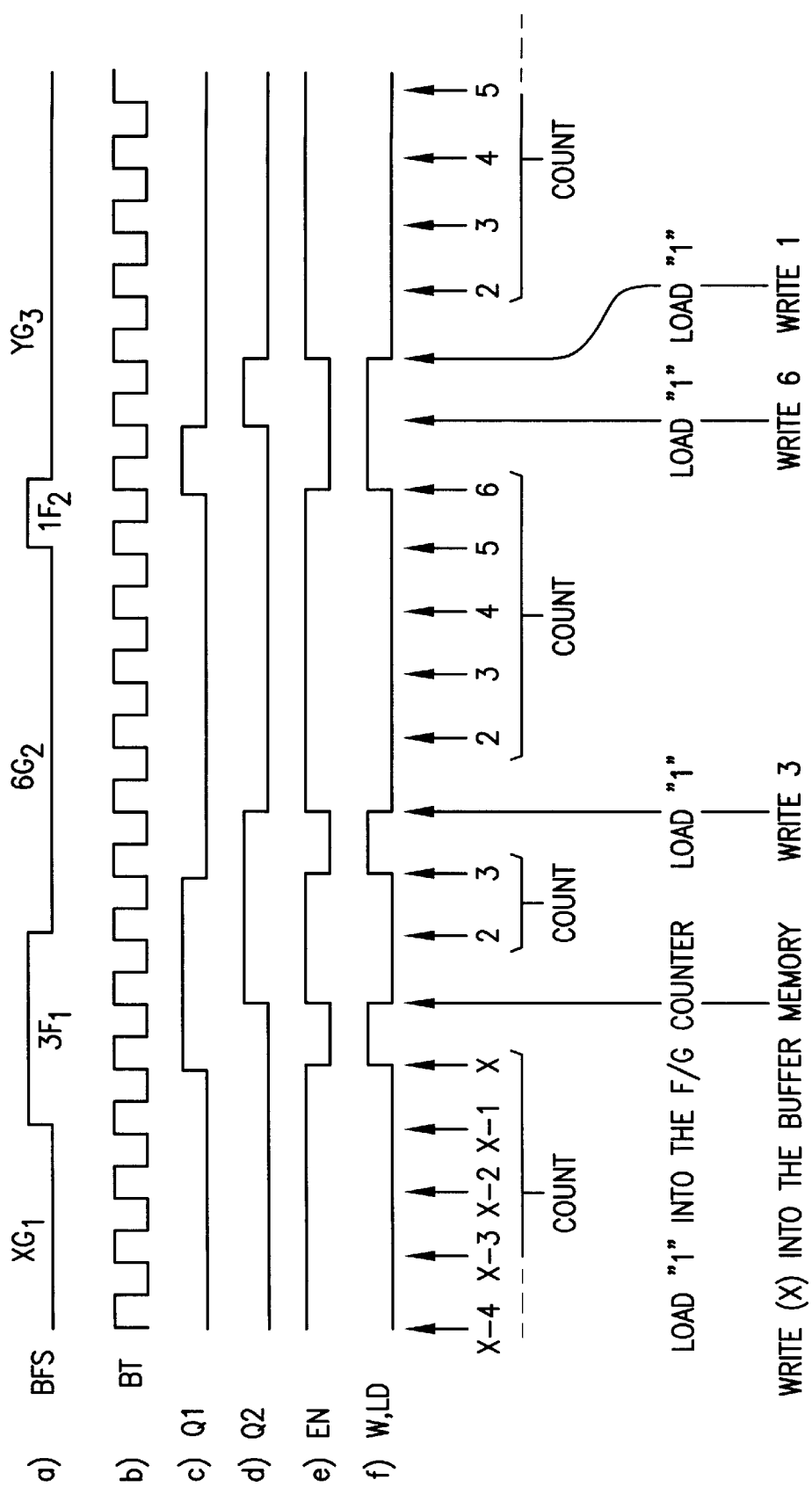
FIG. 2 shows a plurality of timing diagrams for clarifying the sequence of bit error pattern detection.

The operation of the circuit arrangement for sensing errors in bit patterns of the present invention may be elucidated with reference to exemplary signal patterns a through f illustrated in FIG. 2. The signal patterns illustrated in FIG. 2 are plotted as a function of time. FIG. 2, line a, shows bit error signal BFS of comparator circuit 3. FIG. 2, line, shows bit timing BT having a fixed clock frequency. FIG. 2, lines c and d, show the two output signals $Q_1$, $Q_2$ of flip-flops 7.1 and 7.2, respectively. FIG. 2, line e, shows enable signal EN at the input of counter 11. FIG. 2, line f, shows load signal LD for counter 11 and write signal W for buffer memory 13.

As previously noted, bit error signal BFS is used as a basis for detecting errors in bit patterns. With specific reference to FIG. 2, line a, in the present example the first value $G_1$ represents the interval X between the previous, most recent error and the first error $F_1$ shown in the figure. Thus, there are X number of clock-pulse periods between the two errors. Following this first bit error-free period of time $G_1$ is a period of time during which bit errors are measured. This period is three clock-pulse periods long and is characterized by $3F_1$. This is followed, in turn, by a period of time $6G_2$, during which no bit errors occur and which is six clock-pulse periods long. The period $6G_2$ is followed, in turn, by a period of time $1F_2$, during which one bit error occurs and which is one clock-pulse period long. Finally, a period of time $YG_3$ is shown, which is free of bit errors and has a length of Y clock-pulse periods.

Referring now specifically to FIG. 2, lines b and c, as embodied herein bit error signal BFS is fed, together with bit timing BT to pulse-generating circuit 5. First flip-flop 7.1 synchronizes the bit error signal to the bit timing, so that the rising edge of period $3F_1$ is synchronized to the next rising edge of the bit timing. Similarly, the falling edge of period $3F_1$ is synchronized to the next rising edge of the bit timing. The resultant signal pattern is depicted in FIG. 2, line c as output signal $Q_1$.

Second flip-flop 7.2 is fed output signal $Q_1$ from first flip-flop 7.1 and produces output signal $Q_2$ having a time delay relative to output signal $Q_1$. Because signal $Q_1$ is synchronized to the bit timing, output signal $Q_2$ is delayed in time precisely one clock-pulse period relative to $Q_1$.

Referring now specifically to FIG. 2, lines e and f, output signals $Q_1$ and $Q_2$ are gated in an exclusive-or operation, as noted above. In this way a signal is produced which will generate a pulse of the length of one clock-pulse period with every signal change, i.e., in response to every rising and falling signal edge of bit error BFS. FIG. 2, line f, illustrates the resultant signal pattern. As embodied herein, this output signal from exclusive-or gate 9 is fed to input LD of counter 11, directly to write input W of buffer 13, and, via an inverter, indirectly to input EN of counter 11. The inverted signal pattern is shown in FIG. 2, line e.

As embodied herein, the signals present at inputs EN and LD give rise to the following results:

A high signal at input EN causes the counter contents of counter 11 to be incremented by one. The counter contents are adapted to be tapped off at outputs $Q_A$ to $Q_N$ at the rate of the bit timing BT. In this way periods of time G are counted. The counting operation is interrupted with the falling edge of signal EN so that. At the moment the counting is interrupted, precisely the value of the duration of period G is present at the counter output.

The falling edge of signal LD causes via input W of buffer memory 13 the active counter contents to be entered and temporarily stored in the buffer memory. The falling edge of signal LD also causes via input LD of counter 11 the counter to be reset at input LD of counter 11 to a value of 1, defined by way of the set inputs. The counting interruption is ended simultaneously with the falling edge of signal LD, i.e., with the rising edge of signal EN. The counter is then again incremented with the next positive clock pulse edge, beginning with the new value "1."

Microcontroller 19 controls the value temporarily stored in buffer memory 13. The stored value fed to parallel-toserial converter 17, which converts the parallel data into a serial data stream. Microcontroller 19 itself processes these signals and relays them via interface 21 for display and storage on PC 23.

The sequence described above is repeated until the measuring operation is ended. In the exemplary embodiment described herein, a numerical series of X, 3, 6, 1 and Y is thus produced, and is transmitted from counter 11 to buffer memory 13. In addition to these numerical values, the output signal from flip-flop 7.1 is fed to the buffer memory. This output signal from flip-flop 7.1 enables a clear correspondence between the stored counter contents and their significance, and thus error length and error interval to be established.

To enhance analysis capabilities, the AIS and SLIP signals, as well as the date and time signal are fed to the buffer memory, and stored there temporarily along with the counter contents of counter 11.

Using the circuit arrangement for sensing errors in bit patterns of the present invention, as exemplified in the embodiment described above, bit pattern errors may be detected using simple means and, with the appropriate software, displayed instantaneously on a PC.

What is claimed:

1. A circuit arrangement for sensing with single-bit precision a bit error signal sequence produced by a comparator circuit on the basis of a test signal and a substantially identical reference signal, the circuit arrangement comprising:

a pulse-generating device for receiving the bit error signal sequence, the pulse-generating device generating a pulse in response to every signal change;

a counting device for receiving the pulse from the pulse-generating device, the counting device including a counter, the counting device incrementing the counter as a function of a supplied bit timing and resetting the counter to the count value 1 when the pulse from the pulse-generating device is applied;

a buffer device for receiving output from the counting device, the buffer device storing the counter content of the counting device in response to the application of the pulse; and an evaluation device for receiving the buffered counter contents.

2. The circuit arrangement for sensing errors in bit patterns as recited in claim 1 wherein the pulse-generating device comprises first and second series-connected flip-flops, the flip-flops including first and second output signals, respectively, and an exclusive-or gate, outputs of the flip-flops being connected to two inputs of the exclusive-or gate for generating the pulse, the inputs of the flip-flops being connected to the external bit timing which is supplied as a clock-pulse signal to the two flip-flops.

3. The circuit arrangement for sensing errors in bit patterns as recited in claim 2 wherein the output from first flip-flop is adapted to be tapped off as an output from pulse-generating device.

4. The circuit arrangement for sensing errors in bit patterns as recited in claim 1 wherein the counting device includes a plurality of set inputs to which the binary count value 1 is applied and an input control signal fed by the pulse, the control signal permitting the counting device to provide a current counter value.

5. The circuit arrangement for sensing errors in bit patterns as recited in claim 1 wherein the buffer device comprises a control input to which a control signal is applied for buffering the contents of the counting device.

6. The circuit arrangement for sensing errors in bit patterns as recited in claim 1 wherein the buffer device is capable of receiving and storing the first output signal from the first flip-flop.

7. The circuit arrangement for sensing errors in bit patterns as recited in claim 1 wherein the buffer device is capable of receiving and storing at least one information signal.

8. The circuit arrangement for sensing errors in bit patterns as recited in claim 1 wherein the buffer device is capable of receiving and storing AIS signals.

9. The circuit arrangement for sensing errors in bit patterns as recited in claim 1 wherein the buffer device is capable of receiving and storing SLIP signals.

10. The circuit arrangement for sensing errors in bit patterns as recited in claim 1 wherein the evaluation device comprises a parallel-to-serial converter for converting parallel output signals of the buffer device for further processing.

11. The circuit arrangement for sensing errors in bit patterns as recited in claim 1 wherein the evaluation device comprises a microcontroller.

12. The circuit arrangement for sensing errors in bit patterns as recited in claim 11 wherein the microcontroller supplies the current date and time.

13. The circuit arrangement for sensing errors in bit patterns as recited in claim 11 wherein the output of the microcontroller comprises an information signal input to the buffer device.

14. The circuit arrangement for sensing errors in bit patterns as recited in claim 1 wherein the evaluation device comprises an interface for connecting a computer.

15. The circuit arrangement for sensing errors in bit patterns as recited in claim 1 wherein the evaluation device is capable of switching to bit error rate measurement in the event of an overflow condition in the buffer device.

* * * * *